UNITED STATES PATENT OFFICE.

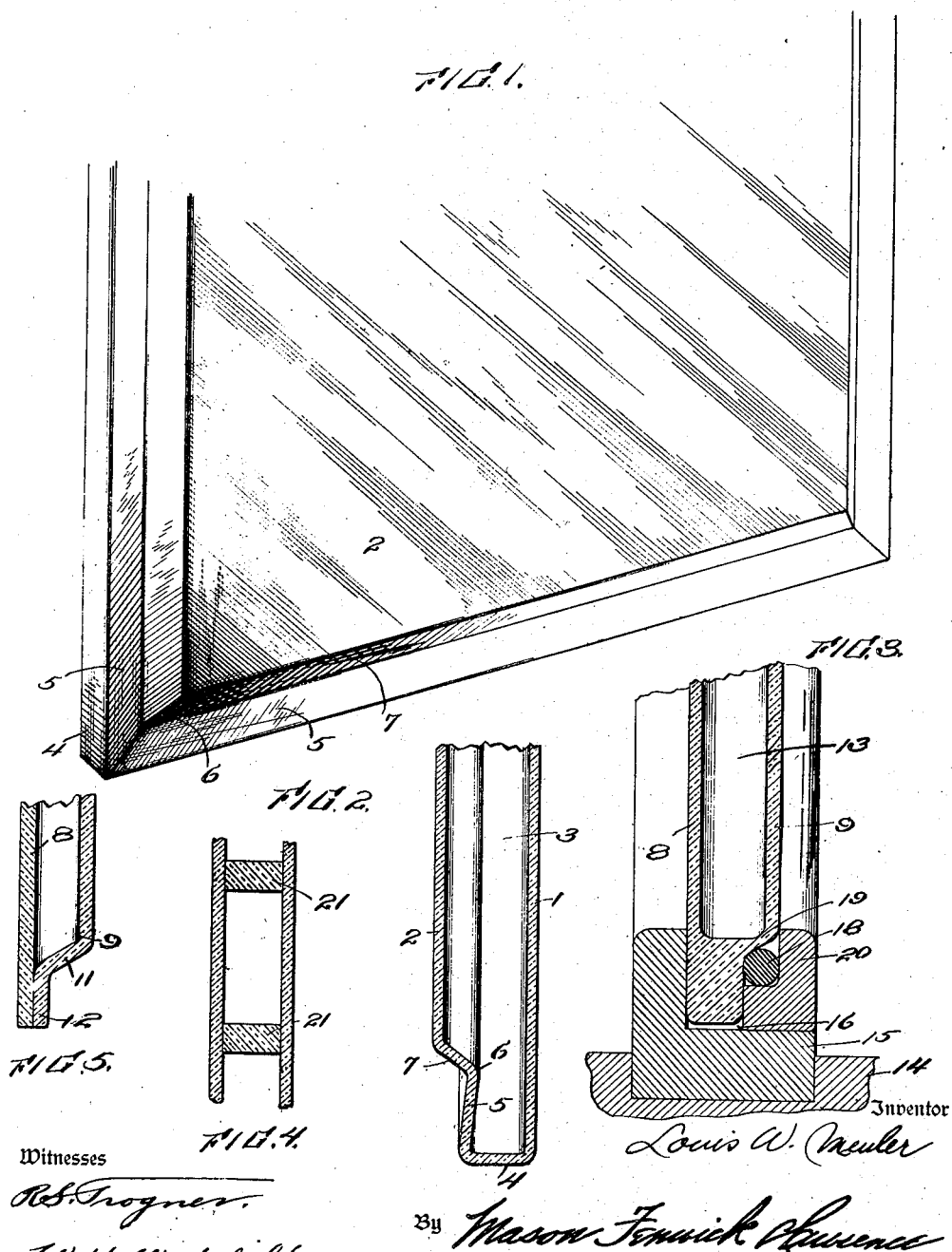

LOUIS W. MEULER, OF BURLINGTON, IOWA.

ANTIFROST GLASS DEVICE.

1,124,778.  Specification of Letters Patent.  Patented Jan. 12, 1915.

Application filed December 23, 1913. Serial No. 808,482.

*To all whom it may concern:*

Be it known that I, LOUIS W. MEULER, a citizen of the United States, residing at Burlington, in the county of Des Moines and State of Iowa, have invented certain new and useful Improvements in Antifrost Glass Devices, and I do hereby declare the following to be a full, clear, and exact description of the invention, such as will enable others skilled in the art to which it appertains to make and use the same.

This invention relates to improvements in window panes, and an object of the invention is to prevent the condensation of moisture on the pane, and thereby prevent the formation of frost which would make the glass less transparent.

A further object of the invention is to produce a hollow pane of glass containing a rarefied air chamber, whatever air there may be in the chamber being dry so as to prevent condensation of water upon the interior walls of the pane of glass.

A further object of the invention is to provide a means for mounting the glass, said means conforming to the peculiar formation of the glass.

With these and other objects in view, the invention consists in certain novel constructions, combinations and arrangements of parts as will be hereinafter fully described and claimed.

In the accompanying drawings, Figure 1 is a perspective view of the pane of glass; Fig. 2 is a section through one corner of the pane of glass as seen in Fig. 1; Fig. 3 is a section taken through one edge of a modified form of the invention showing means for holding the pane of glass in a sash; Fig. 4 is a reduced sectional view through a pane of glass showing a still further modification; and Fig. 5 is a fragmentary view showing the edges of two distinct sheets of glass before the same are welded together, the same showing one method of forming the pane of glass described herein.

Similar reference characters designate corresponding parts throughout the several views.

The general aim of the present invention is to provide a pane of glass having parallel sheets defining the space therebetween which is rarefied, or which contains practically no moisture. There are several different forms of panes of glass which may be provided according to the present invention, and in order to set forth certain of these forms, reference is to be had to the accompanying drawings.

Referring to Figs. 1 and 2, it will be seen that the pane of glass comprises parallel spaced sheets 1 and 2, which define the space 3 located between the parallel sheets. The edges of the two sheets are connected by an edge wall 4 which is preferably formed integral with the sheets 1 and 2. This wall as shown in Fig. 2, constitutes a marginal flange of somewhat less width than the total width of the finished pane of glass, and may have inwardly extending therefrom the wall 5 converging toward the sheet 1 somewhat as at 6, and merging into a beveled shoulder 7, which in turn merges into the sheet 2. The pane of glass is so formed that any section along any edge will be substantially that represented by the showing given in Fig. 2. This form of the invention may be blown or may be formed otherwise, the method of production forming no particular part of the present invention, but whatever the methods of making, it is desirable that the interior space 3 be formed either as a vacuum, or if not a vacuum, made in such a way that the air contained in the space 3 is dry and contains no moisture which upon cooling, would condense upon the exposed faces of the sheets 1 and 2.

By referring to Fig. 3, a modified form of the invention will be seen where a sheet 8 comparable with sheet 1 is connected to a parallel sheet 9 spaced therefrom as in the case of the preferred form of the invention, but the two sheets 8 and 9 are connected by means of an edge wall 4' having a reduced extending solid flange 10. This flange 10 may be made either by blowing the pane of glass or by having two sheets of glass formed substantially as shown in Fig. 5 where the sheet 9 has an offset or beveled shoulder 11 which merges into the flange 12 parallel to and adapted to rest against the edge of sheet 8. After the sheets have been assembled as indicated in Fig. 5, heat may be applied to the edges of the glass adjacent the flange 12, and the edges welded or melted together, so as to become one piece. As in the preferred form of the invention the interior space 13 is to be either rarefied or to contain dry air.

In Fig. 3, the method of mounting the several types of panes in the sash, is indicated. The window casing is indicated generally at 14, and may receive in any approved manner, a sash 15 of somewhat greater width than the width of the extending flange 10. One side of the sash is rabbeted at 16 for the purpose of receiving a rubber bead or washer 18 so formed as to fit into the rounded and beveled shoulder 19 between the sheet 9 and the flange 10. In order that the bead 18 may be held in place there is provided a strip 20 secured in any way to the sash 15 so as to fill out the rabbet. As shown in the drawings, the bottom of the flange 10 is spaced from the bottom of the rabbet 16 so that the full weight of the pane of glass comes upon the elastic bead 18. It will be understood that this is a desirable construction when it is remembered that the space 13 may be rarefied, under which condition the pane of glass will be subjected to strains and for this reason it is desirable to provide an adequate mounting. When the strip 20 is forced into place and the bead 18 compressed, the solid flange 10 resists the pressure and the strain of putting the pane into the sash.

As shown in Fig. 4, when the pane is formed as just described in connection with Figs. 3 and 5, there may be located therein if desired, a number of spacing and reinforcing slugs 21 formed of any suitable material and held either to both the sheets, or to one as the case may be, these slugs 21 being provided in sufficient number to resist the pressure of the atmosphere on the sheets forming the pane of glass when the space therebetween is rarefied.

The invention described herein is designed to be used in the windows of locomotives where there is considerable jarring, where there is always present a certain amount of moisture in the atmosphere, and where it is desirable to be able to see clearly through the glass to avoid mistakes by the engineer. It will therefore be apparent that it is highly desirable to prevent moisture from accumulating upon the sheets of glass forming my improved pane. By providing a vacuum between these two sheets, I am enabled to prevent condensation on the interior and also prevent conduction of cold air from the outside to the inside which is in contact with the moist air.

What I claim is:

1. A pane of glass comprising two spaced sheets, one of them plane to its periphery and the other plane for a smaller area and having a surrounding beveled shoulder secured to the edge of the first-named sheet in an air tight manner.

2. A pane of glass comprising two spaced sheets, one of them plane to its periphery and the other plane for a smaller area and merging at its edge into an internal inwardly beveled shoulder, the latter forming an integral flange around and thinner than the pane and merging integrally into the first-named sheet.

3. A pane of glass comprising two spaced sheets, one of them plane to its periphery and the other plane for a smaller area and merging at its edge into an integral inwardly beveled shoulder, the latter merging into a wall diverging from the first named sheet, and said wall merging into an edge wall which in turn merges integrally into the periphery of said first-named sheet.

4. In a window, the combination with a pane comprising two spaced sheets and a surrounding flange thinner than the pane, flush on one face with one of said sheets, and having a shoulder merging into the other sheet; of a sash having a rabbet against one side wall of which the flush face of said flange rests, a bead resting against the shoulder and the other face of the flange, and a strip closing the rabbet and bearing the bead inward, as described.

In testimony whereof I affix my signature in presence of two witnesses.

LOUIS W. MEULER.

Witnesses:
ADAM MEYER,
ROSE FRENCH.